UNITED STATES PATENT OFFICE.

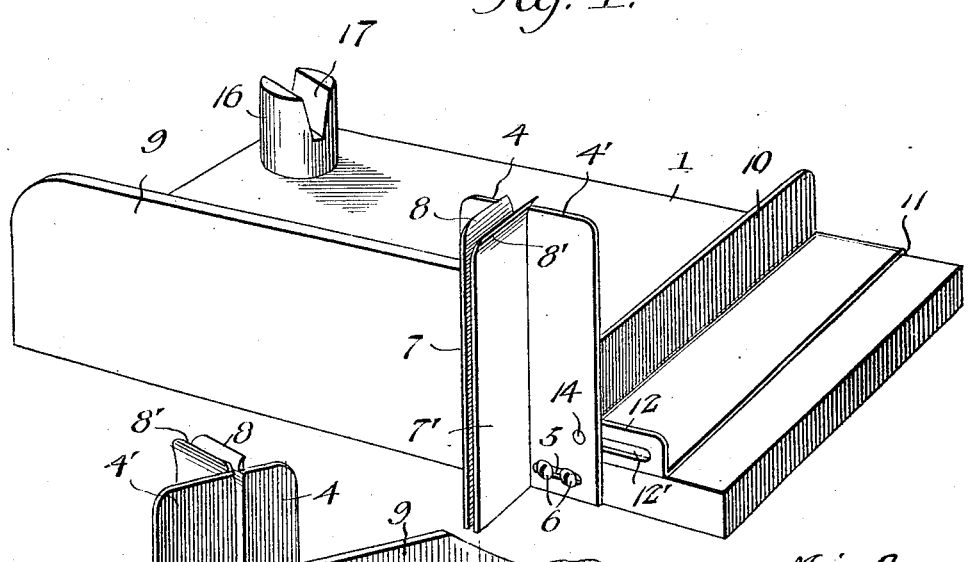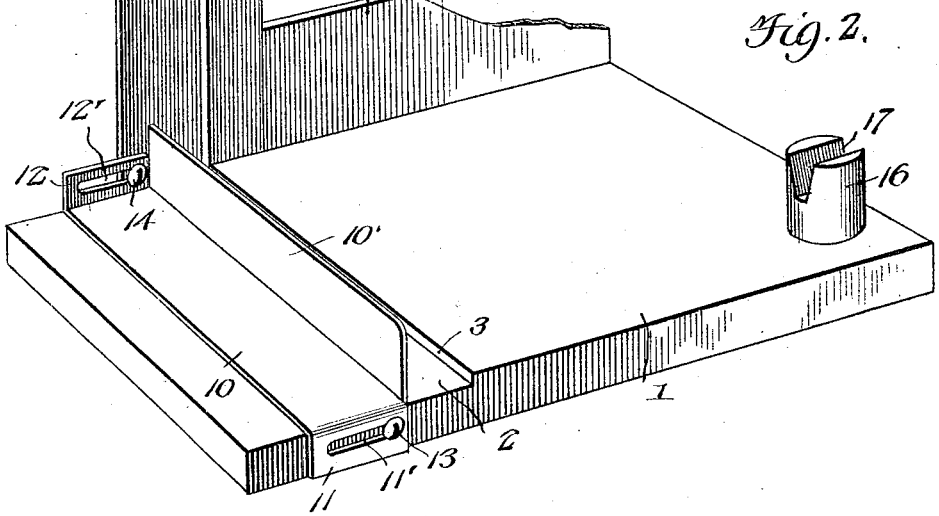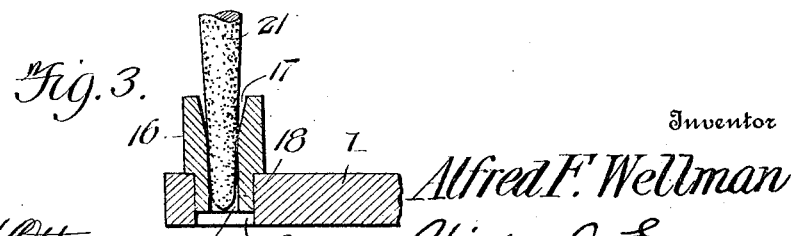

ALFRED F. WELLMAN, OF CINCINNATI, OHIO.

BREAD-SLICER.

1,123,050. Specification of Letters Patent. Patented Dec. 29, 1914.

Application filed February 4, 1913. Serial No. 746,212.

*To all whom it may concern:*

Be it known that I, ALFRED F. WELLMAN, a citizen of the United States, residing at Cincinnati, in the county of Hamilton and State of Ohio, have invented new and useful Improvements in Bread-Slicers, of which the following is a specification.

This invention relates to cutting and slicing devices of that class which are provided with a knife guide and with a gage member to determine the thickness of the slices.

One object of the invention is to provide a simple and efficient knife guide composed of two angle members, one stationary and the other adjustable so as to be readily adjusted to the exact thickness of the knife blade that is being used, thereby preventing wabbling of the blade which would result in the cutting of uneven and irregular slices.

A further object of the invention is to provide a simple and effective gage member which may be easily and precisely adjusted to produce slices of a predetermined thickness, thus enabling a loaf of a given length to be cut into a predetermined number of slices of equal thickness.

A further object of the invention is to produce a simple and improved construction which will insure that the loaf will be cut entirely through at each operation and without a special effort on the part of the operator.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a perspective view of a bread cutting device constructed in accordance with the invention, as seen from the front. Fig. 2 is a perspective view of the device as seen from the rear. Fig. 3 is a sectional detail view of the knife sharpener.

Corresponding parts in the several figures are denoted by like characters of reference.

The bread board 1 is provided at one end thereof with a recess or downwardly offset portion 2 forming a shoulder 3 that extends transversely across the board. Mounted securely on the front edge of the board adjacent to one end of the shoulder 3 are the knife guides which consist of angle plates 4 and 4' of L-shape in cross section, one of said angle plates, 4, being firmly and permanently secured on the edge of the board, while the other angle plate, 4', is provided with a slot 5 for the passage of fastening members, such as screws 6, whereby said angle plate, while it is held securely against tilting, may be adjusted with respect to the angle plate 4 so as to permit a knife blade of any desired thickness to pass between the opposed forwardly extending flanges 7, 7' of said angle plates. The flanges 7, 7' are slightly beveled at their upper ends, as shown at 8, 8', to permit a knife blade to be readily inserted therebetween, such blade being guided by said flanges across the board and substantially at right angles to the front edge thereof. Inasmuch as the blades of carving knives vary considerably in thickness, it is obviously important that the distance between the guide flanges 7, 7' may be varied to enable a blade of any thickness to be guided firmly and accurately at a constant angle with respect to the front edge of the board. The knife guides are so positioned that the space therebetween coincides with the depressed or recessed portion of the bread board just adjacent to the shoulder 3, thus permitting the edge of the knife blade to drop below the level of the raised portion of the bread board, thus enabling a loaf that is supported on said raised portion to be completely severed without special effort on the part of the operator. The raised portion of the bread board is provided at its front edge with an upwardly extending flange 9 in engagement with which the loaf may be guided.

A gage member is provided, the same consisting of an angle plate 10 of a length equal to the width of the bread board, but said angle plate being supported on the recessed portion 2 of said board with its upstanding flange 10' in parallel relation to the shoulder or offset 3. The plate 10 is provided at its rear end with a downturned lip 11 abutting on the rear edge of the board 1, and said plate 10 is provided at its front end with an upturned lip 12 which is substantially flush with the front edge of the board and the front face of which partly abuts on the adjustable knife guide member 4'. The lips 11, 12 are provided with a slot 11', 12' for the passage of fastening members such as screws, one of which, 13, engages the edge of the bread board through the slot 11', while the other set screw 14 engages the knife guide member 4' through the slot 12'. The upstanding lip 12 serves to give additional strength and stability to the adjustable knife guide member 4', and the adjustment of said member, when needed, will not be interfered with, but may be effected independently of the guide member by loosening the screws 13 and 14, and as will readily be understood.

At one corner of the bread board is mounted a sharpening device consisting of a block 16 having a beveled recess 17 and a shank 18, whereby it may be fitted in a recess 19 in the board 1, near one corner thereof. The block 16, which has been shown as of cylindrical shape, is also provided with a vertical axial aperture 20 wherein the lower end of an abrading member, such as a hone or a carving steel may be supported, as indicated at 21, in Fig. 3, said hone or steel projecting upwardly between the walls of the beveled recess 17, thus enabling a knife blade to be drawn between the abrading member and the walls of the recess for the purpose of sharpening the edge, as will be readily understood.

The improved cutting device, as will be seen from the foregoing description, is extremely simple in construction and may be produced at a moderate expense. By the use thereof a loaf may be cut into slices of even shape and of equal dimensions with great facility and with no undue effort on the part of the operator.

Having thus described the invention, what is claimed as new, is:—

A bread slicer comprising a board, a loaf guide located at the edge of the board, knife guides located at the same edge of the board as that at which the loaf guide is mounted, one of the said knife guides being fixed to the board at the end of the loaf guide and the other knife guide being mounted on the board for adjustment with relation to the fixed knife guide, both of said knife guides throughout the major portion of the vertical length being rectangular in transverse section, and each knife guide having a portion which stands out from the adjacent edge of the board at a right angle thereto.

In testimony whereof I affix my signature in presence of two witnesses.

ALFRED F. WELLMAN.

Witnesses:
 OSCAR W. KUHN,
 MORGAN VAN MATER.